United States Patent [19]
Jacobs et al.

[11] Patent Number: 5,777,866
[45] Date of Patent: *Jul. 7, 1998

[54] POWER FACTOR CONTROL FOR SWITCHED MODE RECTIFIERS WITH IMPROVED REPRESENTING OF CURRENTS IN EMI CAPACITIVE ELEMENTS

[75] Inventors: Mark Elliott Jacobs, Dallas; Yimin Jiang, Plano; Vijayin Joseph Thottuvelil, Plano; Rui Liu, Plano, all of Tex.

[73] Assignee: Lucent Technologies Inc., Murray Hill, N.J.

[*] Notice: The term of this patent shall not extend beyond the expiration date of Pat. No. 5,687,070.

[21] Appl. No.: 789,125

[22] Filed: Jan. 27, 1997

Related U.S. Application Data

[63] Continuation-in-part of Ser. No. 452,482, May 26, 1995, abandoned.

[51] Int. Cl.$^6$ ............................ H02M 7/06; H02M 5/42; G05F 1/652
[52] U.S. Cl. ............................ 363/126; 363/89; 323/222
[58] Field of Search ............................ 323/222; 363/46, 363/47, 48, 124, 126

[56] References Cited

U.S. PATENT DOCUMENTS

| | | |
|---|---|---|
| 4,677,366 | 6/1987 | Wilkinson et al. |
| 4,683,529 | 7/1987 | Bucher, II .................... 363/44 |
| 5,001,620 | 3/1991 | Smith .................... 363/89 |
| 5,012,058 | 4/1991 | Smith .................... 219/10.55 B |

OTHER PUBLICATIONS

Electronic Design, Douglas Thom, Capacitor Drops Voltage with Little Heat for Low-Cost, Low-Voltage Power Supply, Nov. 22, 1975, p. 148.

Kelkar and Lee, "A novel Input Filter Compensation Scheme For Switching Regulators", PESC, Jun. 14, 1982, pp. 260–271.

Kelkar and Lee, "Adaptive Input Filter Compensation For Switching Regulators", IEEE Trans. Aerospace and Electronic Systems, vol. AES-20, No. 1, pp. 57–66, Jan. 1984.

Todd, "UC3854 Controlled Power Factor Correction Circuit Design", Unitro Application Note, (Unitrode Integrated Circuits of Merrimack, NH; Integrated Circuits/U-134, pp. 10-303 through 10-322).

Andreycak, "Optimizing Performance in UC3854 Power Factor Correction Applications", Unitro Design Note, (Unitrode Integrated Circuits of Merrimack, NH; Integrated Circuits/DN-39E, pp. 10-527 through 10-531).

*Primary Examiner*—Peter S. Wong
*Assistant Examiner*—Bao Q. Vu

[57] ABSTRACT

A power factor correction system with an EMI line filter at the input includes circuitry to sense the capacitor current of the EMI filter to improve the accuracy of the power factor enhancement. The circuitry consists of a current sensing means connected after the EMI filter, and a voltage sensing capacitor which derives its input signal from a pair of diodes separate from the conventional 4-diode rectifier bridge, which are connected either before or after the EMI filter. The current-sensing means, which may be a resistor, and the voltage-sensing capacitor are tightly coupled to the current control loop of the power factor correction system to compensate for the current in the EMI filter capacitors.

12 Claims, 12 Drawing Sheets

Prior Art

FIG. 4

Prior Art

POWER FACTOR CONTROL FOR SWITCHED MODE RECTIFIERS WITH IMPROVED REPRESENTING OF CURRENTS IN EMI CAPACITIVE ELEMENTS

This application is a continuation-in-part of application Ser. No. 08/452,482, filed May 26, 1995, now abandoned.

FIELD OF THE INVENTION

This invention relates to control circuit improvements for power-factor-controlled switched-mode rectifiers (PFC SMRs) and in particular control circuits that enhance power factor by providing compensation for reactive currents in the differentially connected capacitors used in input EMI filters without introducing attendant control circuit instability.

BACKGROUND OF THE INVENTION

Power factor control for switched mode rectifiers is a varied and active art driven to a large extent by the need to meet standards such as IEC 555-2 for limiting generation of AC line harmonics. Most power factor controls use a feedback control which is sometimes combined with feed forward to meet rigid standards. The control circuit and process disclosed in U.S. Pat. No. 4,677,366 has achieved widespread usage and is described in a UNITRODE™ application handbook (1995-96). The process is implemented in the commercially available UC3854 type integrated circuit. Another power factor control circuit has been disclosed in U.S. Pat. No. 5,391,976. These exemplary power factor control circuits are quite effective in controlling the power factor when operated independently but their performance often deteriorates in practical circuits requiring significant EMI filtering at the power input by introducing instabilities into the power factor control circuit.

It is well known that SMRs intrinsically generate high levels of conducted noise currents on the input leads as a consequence of their high frequency switching operation, and this noise must be substantially attenuated to prevent interference with other electronic equipment. The admissible levels of conducted noise currents are described in national and international standards such as FCC Part 15, CISPR-22 and EN-55022. The design approach to limit conducted noise is to use a multi- stage low pass filter connected in series with the rectifier input leads.

This low pass filter is comprised of one or more inductors and one or more capacitors arranged to attenuate the high frequency components of the switching-induced currents while passing line frequency components with little distortion. To achieve high rectifier power conversion efficiency, the inductive and capacitive elements are designed with minimal parasitic resistance, resulting in a distinct resonance at a frequency roughly in the range of 5–20 kHz.

High power factor operation of the rectifier requires that the ac input line current be measured and the duty cycle of the rectifier high frequency switching process be controlled so that the ac input line current approximates a sinusoidal wave form in-phase with the ac line voltage. This current control process is designed with a bandwidth of 5 kHz or more so that a sinusoidal current wave form can be faithfully reproduced. The similar magnitudes of the resonant frequency of the low-pass input filter and the bandwidth of the current control process imply that precautions must be taken by the circuit designer to assure stable rectifier operation.

Figure 1:
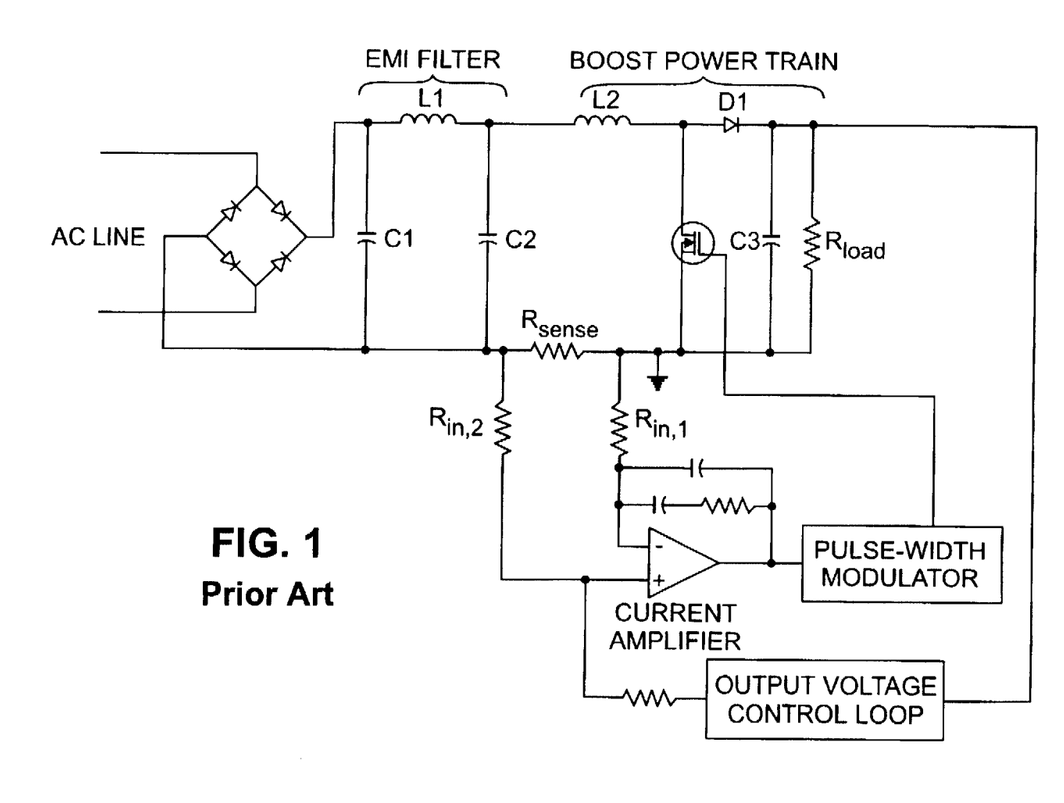
FIG. 1 is a schematic of a prior-art high power factor boost circuit including an EMI filter and a feedback control.

A typical prior-art circuit arrangement as described above, providing a dc output voltage, incorporates a boost-type power train combined with an input current EMI filter, and includes a control process to provide high power factor as shown in FIG. 1. This arrangement does not use a line-voltage sense process. This boost type power factor correction circuit is well known and its operation is well known to those skilled in the power factor correction art. A more complete circuit schematic is shown in the cited UNITRODE Handbook. Alternatively, other power train circuit topologies such as a SEPIC, buck-boost, flyback, etc., can be used.

A limitation of the circuit in FIG. 1 is the degradation of power factor as the load on the rectifier is reduced or the rectifier is operated at high ac input line voltage. This occurs because the voltage developed by the current sense resistor $R_{sense}$ does not measure the reactive input line current that flows through the EMI by-pass capacitors $C_1$ and $C_2$, and this current is not in-phase with the ac input line voltage. In addition, there is a waveform distortion resulting from a combination of the EMI filter capacitors and the presence of a diode bridge. The distortion occurs at the zero crossing of the voltages. An improvement to the circuit would seem to be to relocate the resistor $R_{sense}$ to the left of $C_2$ as shown on FIG. 2 to account for the line frequency current through $C_2$ in the control process. However, relocating $R_{sense}$ as shown on FIG. 2 introduces a control loop instability which can be understood as follows: The low-pass EMI filter and the sense resistor arranged as shown on FIG. 1 introduce a left-half plane double zero followed by a double pole in the loop gain of the current control loop, all near 10 kHz; these do not necessarily cause control loop instability because the leading phase of the double zero is encountered at a lower frequency than the double pole on the Bode plots of FIGS. 3 and 4. In the arrangement shown on FIG. 2, a double pole is introduced near the intended cross-over frequency for the control loop, causing a potential instability which can be difficult to mitigate.

Figure 2:
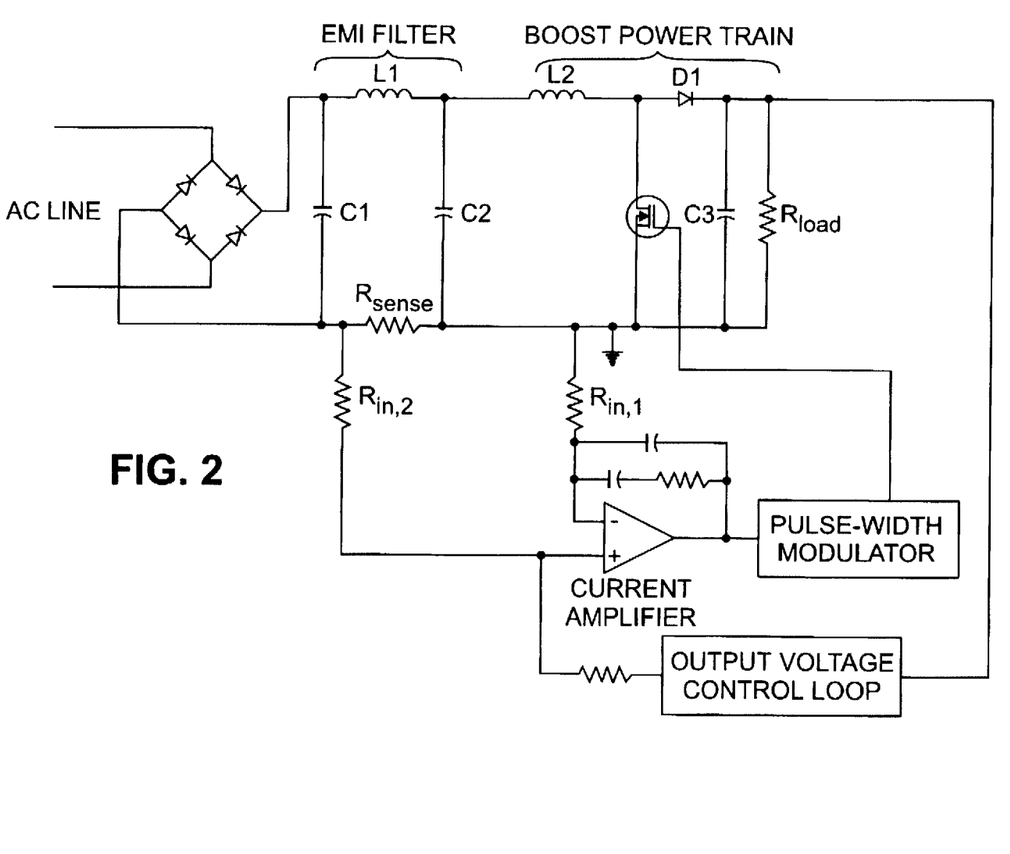
FIG. 2 is a schematic of a boost circuit as above but with the current-sense resistor located to the left of the capacitor 2.
Figure 3:
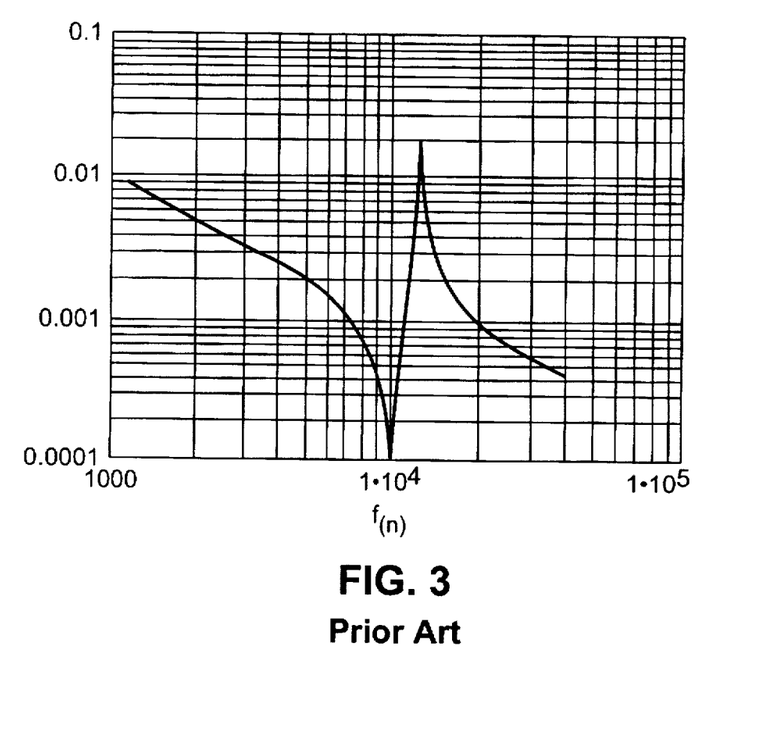
FIGS. 3 and 4 are graphs of Bode plots of frequency responses of the feedback control circuitry of FIG. 1.
Figure 4:
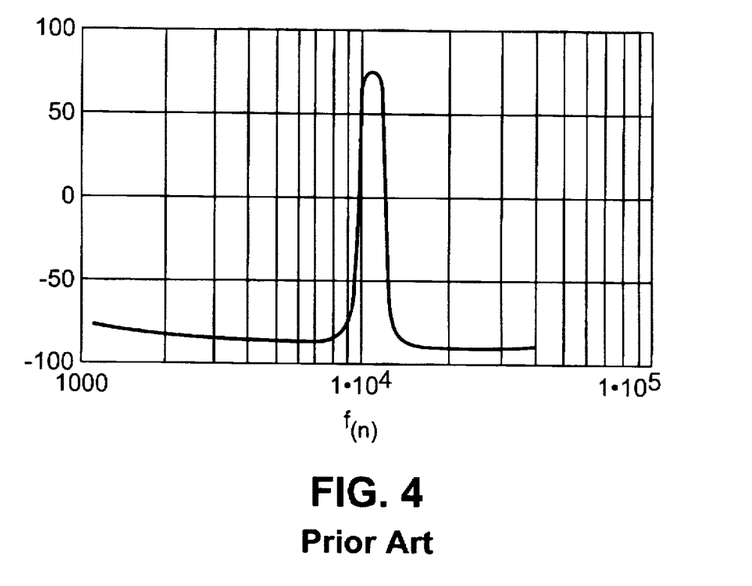
Figure 5:
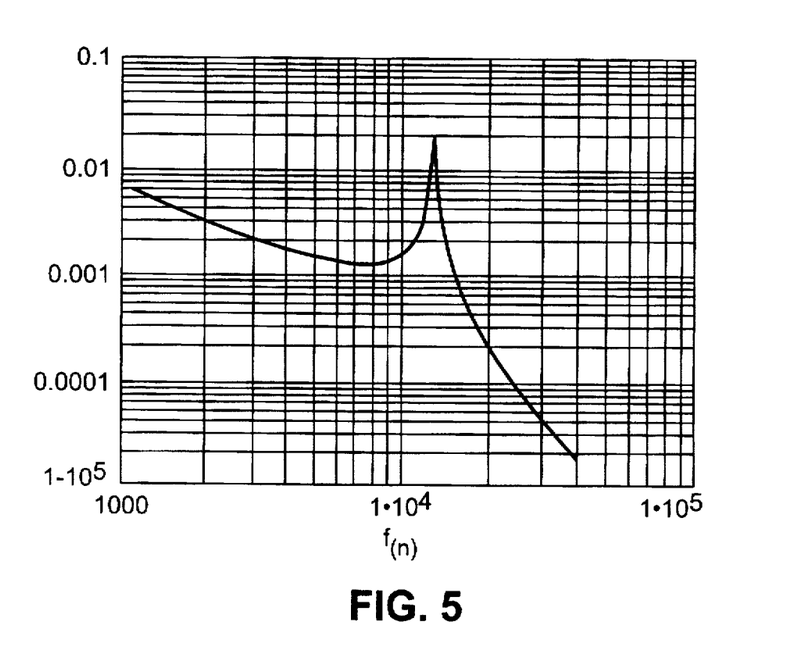
FIGS. 5 and 6 are graphs of Bode plots of frequency responses of the feedback control circuitry of FIG. 2.
Figure 6:
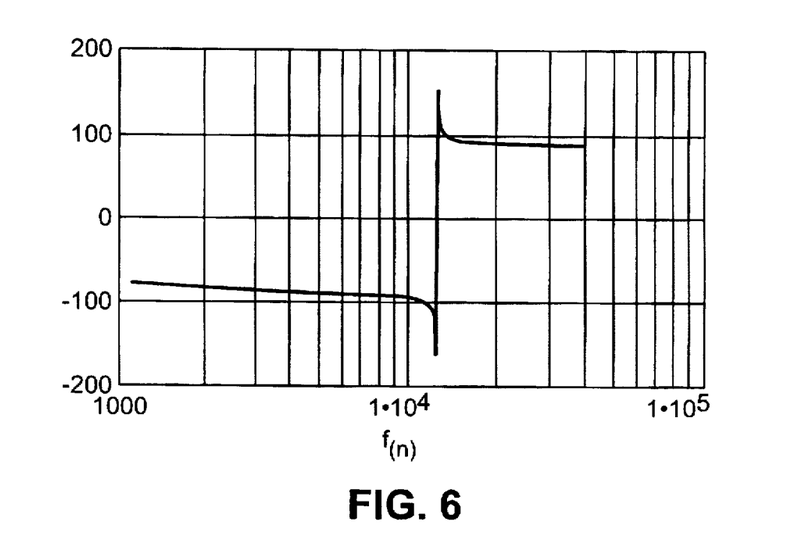

The arrangement on FIG. 1 permits a current control loop bandwidth of at least 10 kHz, whereas the arrangement on FIG. 2 generally requires a bandwidth of 1 kHz or less to achieve the required design margins for current loop stability, which is too low a frequency for faithful sinusoidal input current reproduction. Control-loop Bode plots for the circuit arrangements described by FIGS. 1 and 2 are shown in FIGS. 3, 4, 5, and 6 respectively, demonstrating the adverse effect caused by a sense resistor located to the left of capacitor $C_2$. (On FIGS. 5 and 6 the discontinuity in phase at about 12 kHz is caused by limiting of the plotted phase angle by the plotting program to + or −180°.)

In the prior art arrangements as discussed above the power factor control does not accurately account for the current in the capacitors of the EMI filter at the input of the converter. These capacitor currents vary with the AC line voltage, and accurate power factor correction requires that they be included in the control process.

SUMMARY OF THE INVENTION

Therefore in accord with the invention a power factor control circuit is provided as recited in the claims.

In one particular embodiment the invention contemplates providing split current sensing resistors located with the EMI filter where it may be tightly coupled to the current control loop of the power factor control. The invention also contemplates a capacitive sensing of the rectified AC line voltage to provide an accurate compensation for capacitor current of the EMI filter.

In one illustrative embodiment disclosed herein, a voltage sensing connection utilizes a small capacitor connected to the rectified AC line to supply a capacitor voltage sense signal to the input current sense amplifier of the power factor control circuit. This voltage sense signal is added to the signal representing the current sensed by the current sense resistor. This allows the current control loop to more accurately control the total current drawn by the rectifier, regardless of the load magnitude.

In yet another embodiment the capacitor voltage sense signal is filtered to reduce noise, without adversely affecting rectifier stability. Advantageously, the filtered input signal to the capacitor is derived through a separate bridge device such as a diode rectifier that is independent of the rectifier elements of the SMR.

DETAILED DESCRIPTION

Figure 7:
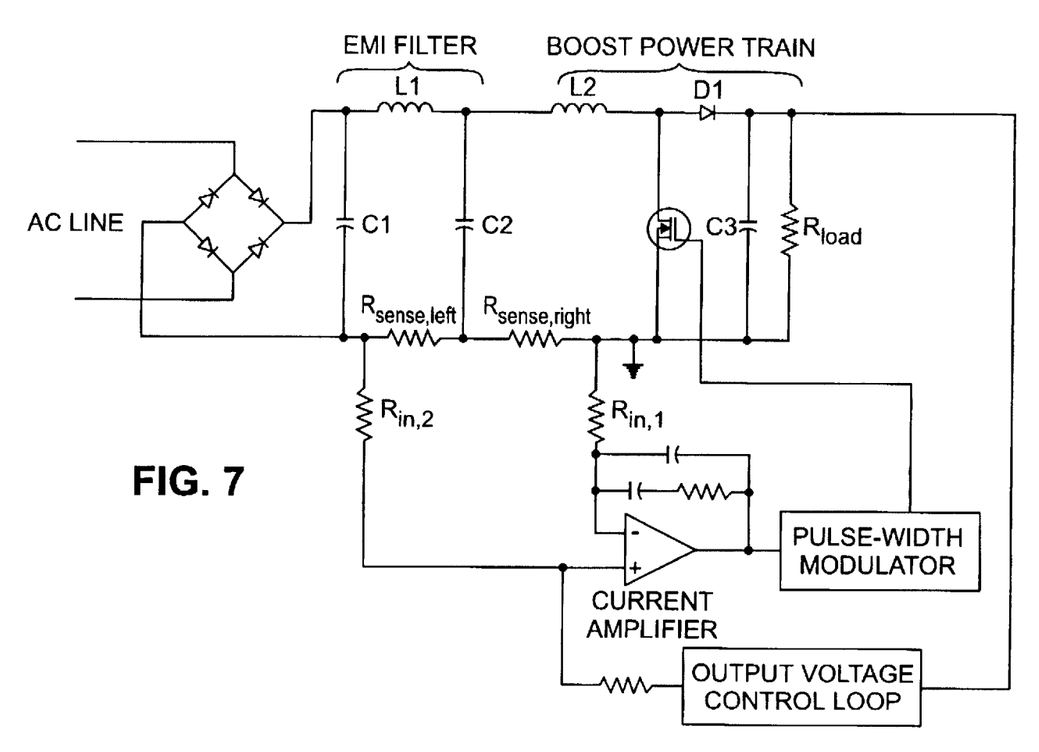
FIG. 7 is a circuit schematic of a power factor control arrangement using two current-sense resistors located with respect to capacitor 2 in accord with the invention.

In FIG. 7 an EMIπ filter is connected to receive a DC voltage from an AC line energized rectifier. The EMI filter has a series filter inductor $L_1$ and two capacitor legs having the two capacitors $C_1$ and $C_2$ respectively. The EMI filter is followed by a boost power train having a boost inductor $L_2$, a FET power switch and an output rectifier diode D1 connected to an output filter capacitor $C_3$ and the $R_{load}$. Two current sensing resistors $R_{sense,left}$ and $R_{sense,right}$ are connected on different sides of the second leg of the filter. Current sensed by these resistors is applied to a current sense amplifier which also has an input from a output voltage control loop. The output of the current amplifier drives a pulses width modulator which in turn controls the FET power switch.

Figure 8:
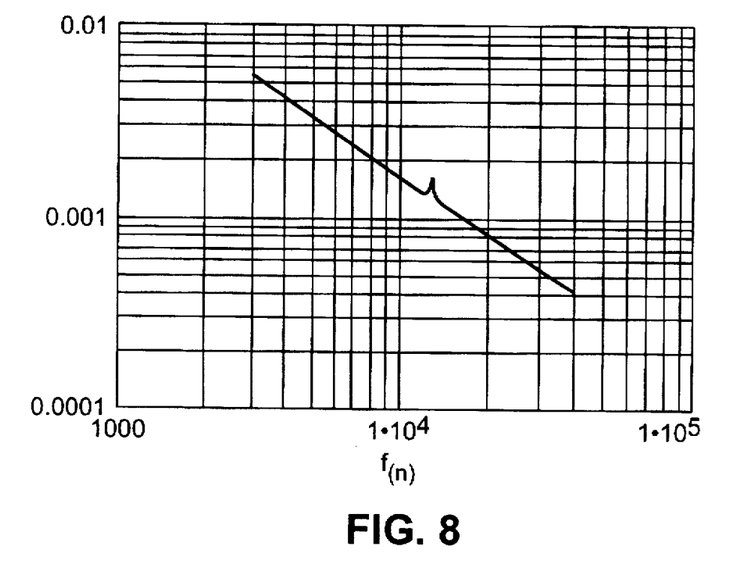
FIGS. 8 and 9 are graphs of Bode plots of frequency responses of the feedback control circuitry of FIG. 7.
Figure 9:
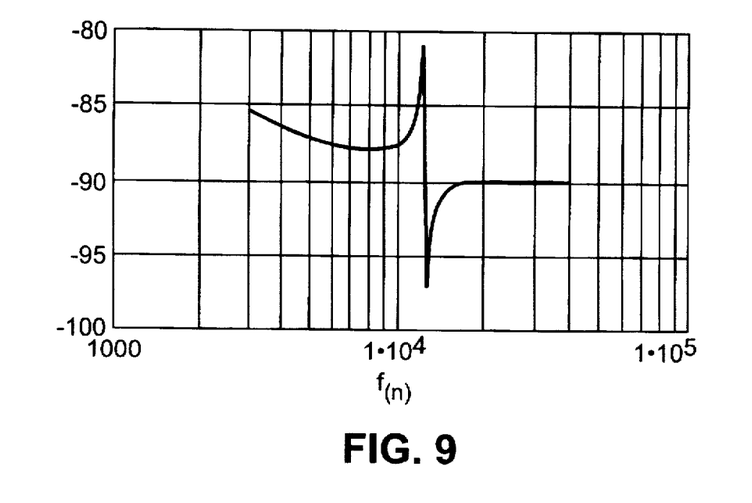

This arrangement improves the dynamics of the current control loop by utilizing the two sense resistors, one on each side of capacitor $C_2$ as shown in FIG. 7. If the resistors $R_{sense,left}$ and $R_{sense,right}$ are proportioned according to equation:

$$\frac{R_{sense,left}}{R_{sense,right}} = \frac{L_1}{L_2} \quad (1)$$

then the control-loop poles and zeroes introduced by the EMI filter are essentially canceled, resulting in the stability-conforming Bode plots shown in FIGS. 8 and 9. From a power factor perspective, the circuit in FIG. 7 is a modest improvement over that in FIG. 1 because only a fraction of the current in capacitor $C_2$ is sensed by $R_{sense,left}$. If, however, the resistor $R_{sense,left}$ is made greater than the value indicated by Equation (1), then control loop instability is likely to result.

Figure 10:
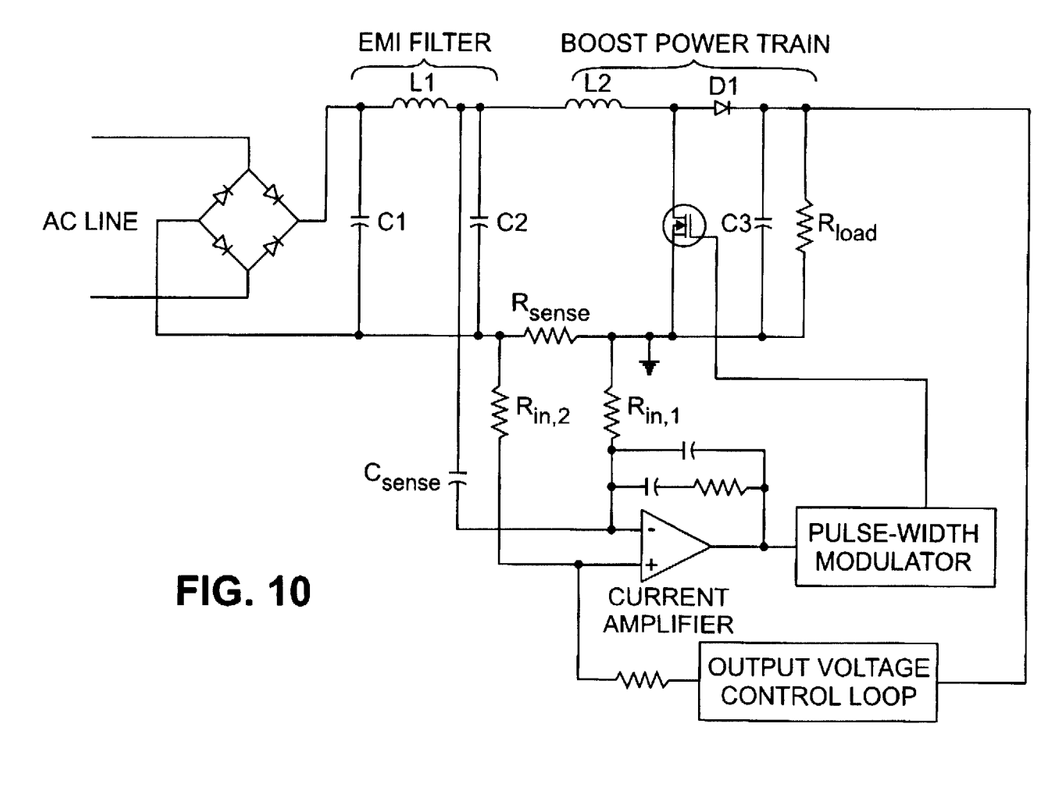
FIGS. 10 and 11 are circuit schematics of alternative power factor control arrangements having capacitor sense arrangements in accord with the invention.

A substantially better implementation can be obtained by recognizing that a functionally equivalent alternative to sensing capacitor current with a sense resistor is to emulate capacitor current by a sense capacitor $C_{sense}$ connected as shown on FIG. 10. In this circuit the left hand sense resistor $R_{sense,left}$ is removed and the sense capacitor $C_{sense}$ is connected between a node common to the filter inductor $L_1$ and the boost inductor $L_2$ and the current sense amplifier. The sense capacitor $C_{sense}$ adds a current to the input to the current control loop operational amplifier which represents the equivalent of the signal that would have been generated by a sense resistor $R_{sense,left}$ due to the current in capacitor $C_2$. The required equivalence between $R_{sense,left}$ and $C_{sense}$ is given by:

$$R_{sense,left} = \frac{C_{sense} \times R_{in}}{C_2} \quad (2)$$

Providing a capacitor sense process for the current in $C_2$ has the same effect on control-loop stability as providing a sense resistor to the left of $C_2$. Similar to Equation (1), pole-zero cancellation for the low pass EMI filter occurs when:

$$C_{sense} = \frac{L_1 \times C_2 \times R_{sense,right}}{L_2 \times R_{in}} \quad (3)$$

Values of $C_{sense}$ larger than that represented by Equation (3) will likely result in control loop instability due to the introduction of a double pole at a lower frequency than a double zero.

Figure 11:
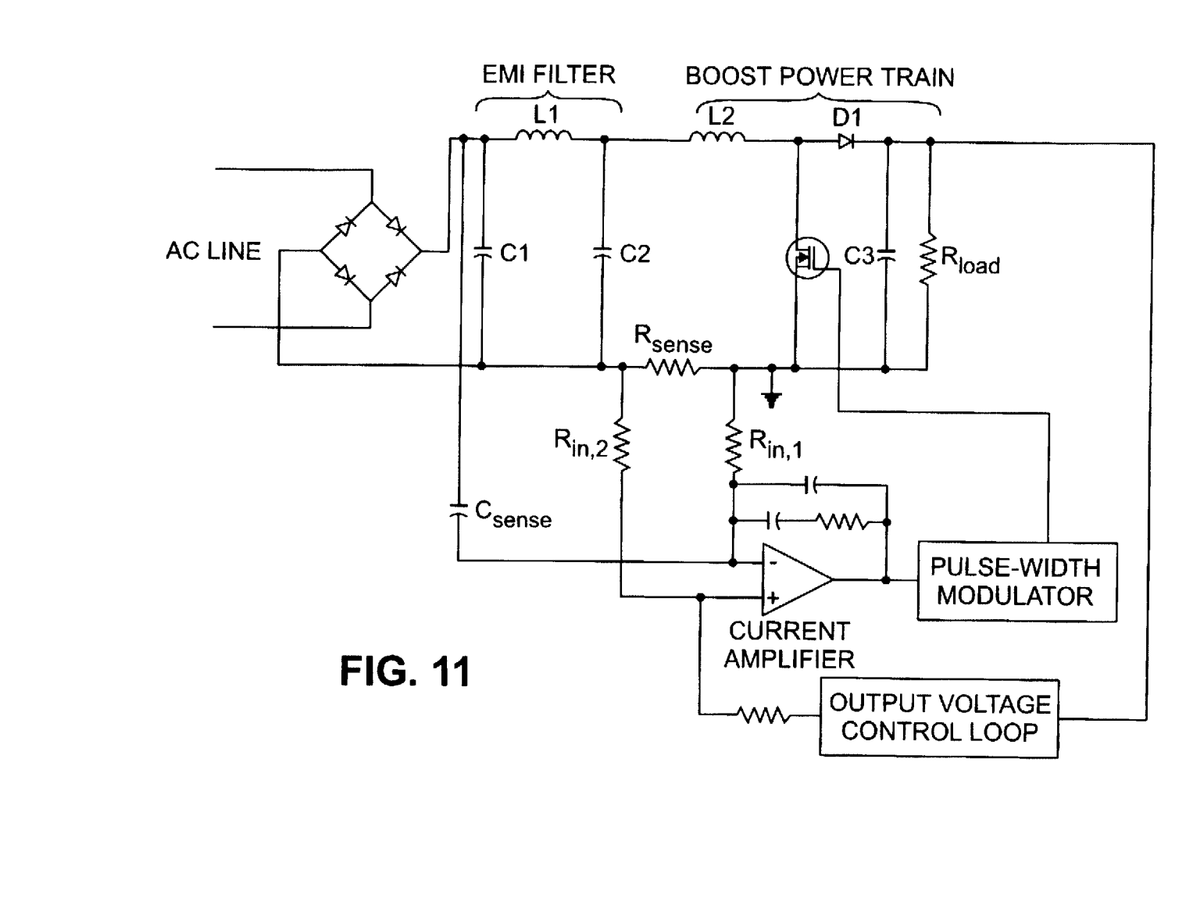

However, using a sense capacitor to compensate for the current in $C_1$ and/or $C_2$ provides a new opportunity to avoid the control loop instability produced by a sense resistor connected to the left of capacitor $C_2$. By connecting the sense capacitor to the left of the EMI filter, i.e., on the ac line side as shown in FIG. 11, rather than directly to the top of $C_2$, it is de-coupled from the EMI filter reactive elements, and no stability issues result because it is now feed forward to the control loop. Thus the current in any or all differentially connected capacitors can be included in the power factor control process without the stability-affecting magnitude restrictions on $R_{sense,left}$ while, at the same time, maintaining the necessary bandwidth for accurate reproduction of the current wave form. The required value for the capacitor $C_{sense}$ is given by:

$$C_{sense} = \frac{C_{sum} \times R_{sense}}{R_{in}} \quad (4)$$

where $C_{sum}$ is the sum of the differentially connected EMI capacitors to be compensated.

In a practical implementation of the capacitor sense circuit, a resistor divider would be used (with a divider ratio typically of 100:1 or more) to reduce the exposure of the operational amplifier to ac line transients. With such a divider, the value of the sense capacitor should be increased by a factor of the divider ratio.

Figure 12:
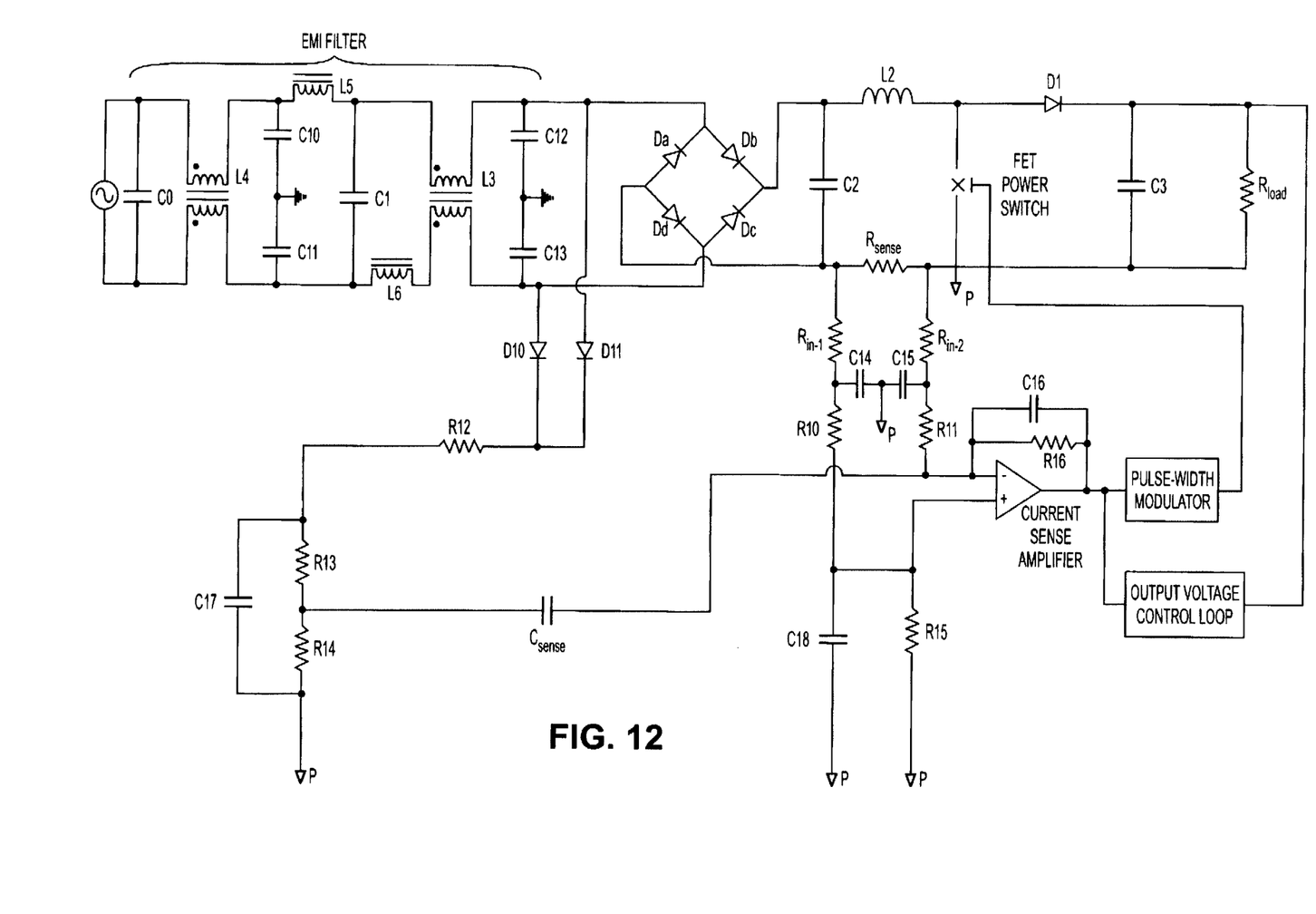
FIG. 12 is a circuit schematic diagram of a power factor control arrangement in which the AC line voltage is capacitively sensed through a bridge device independent of the rectifier elements of the SMR.
Figure 13:
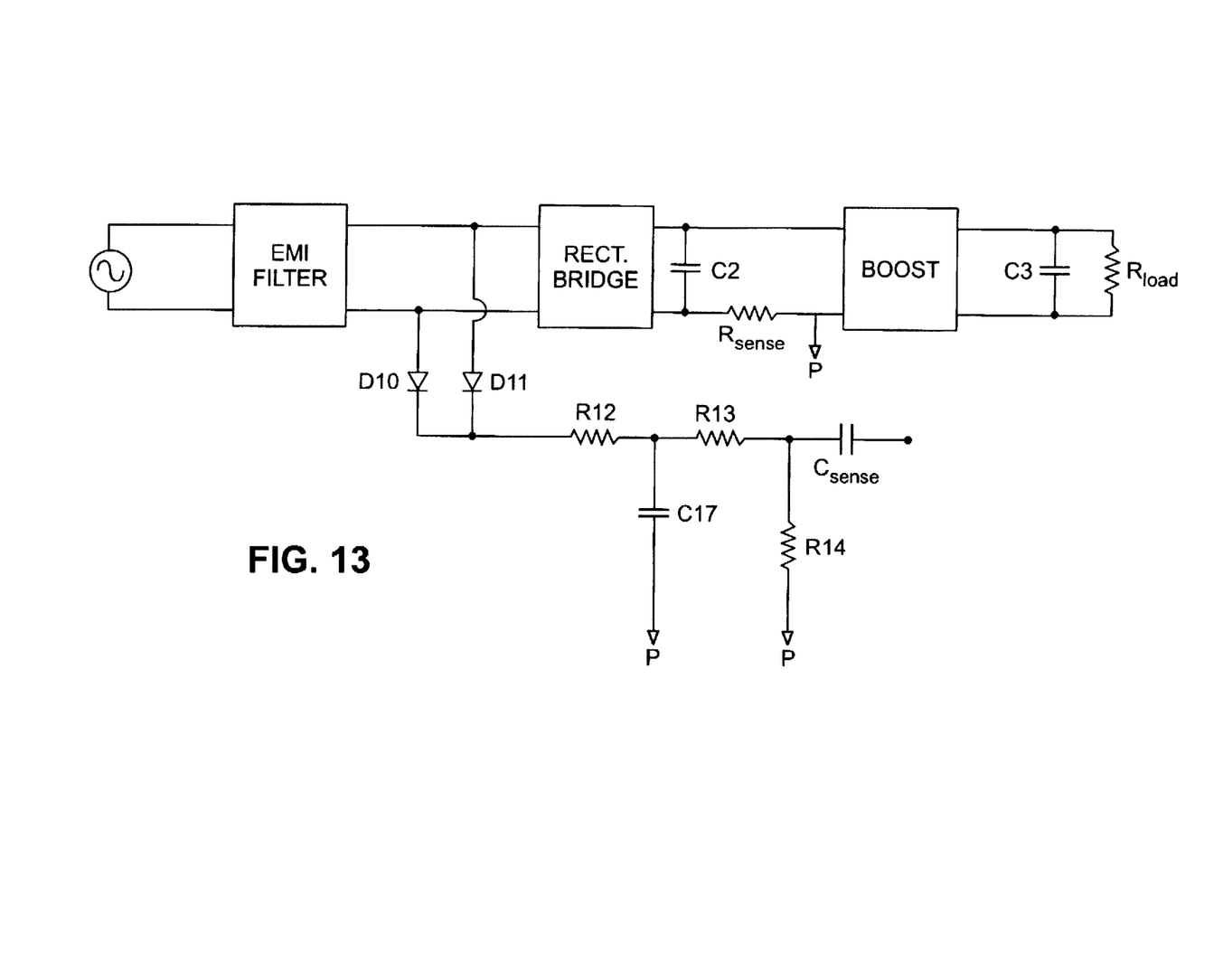
FIG. 13 is a circuit block diagram of the detailed arrangement of FIG. 12, showing the circuit location of the independent diode pair tap and a voltage divider network.
Figure 14:
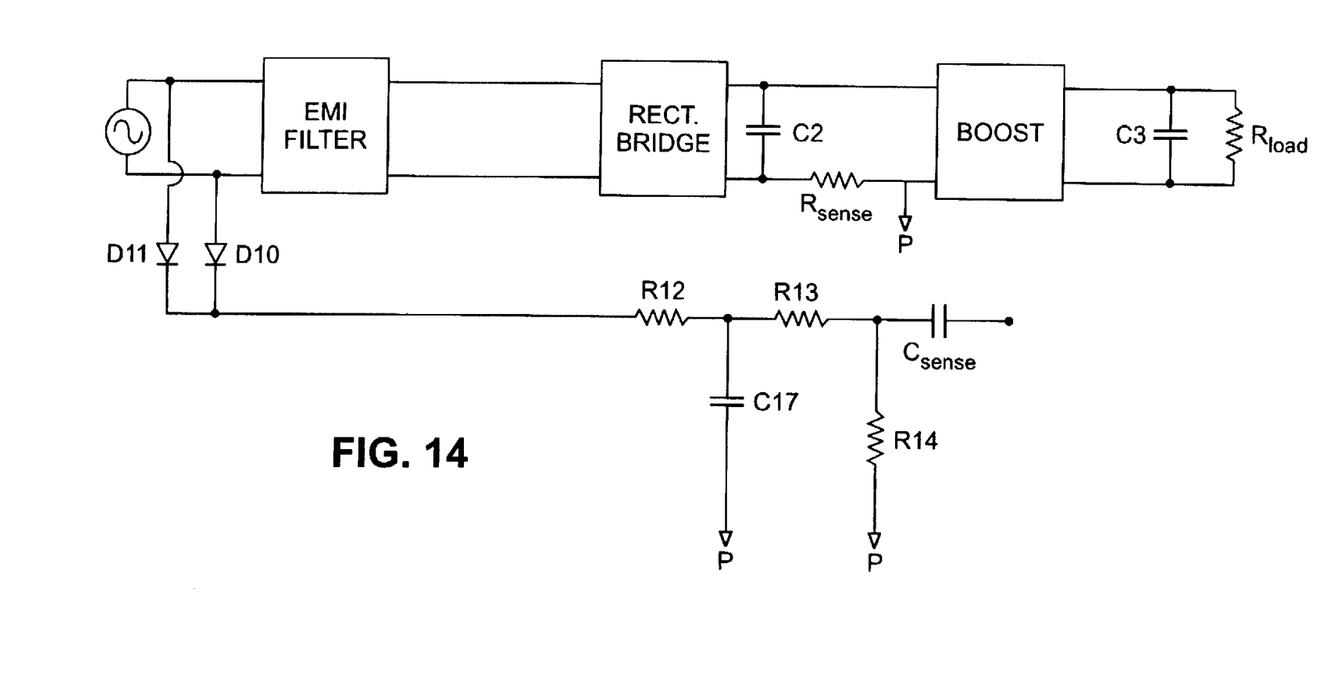
FIG. 14 is a circuit block diagram showing an alternative location of the independent diode pair tap.

In designing a switched mode rectifier it is often advantageous to locate the EMI filter elements between the AC voltage source and the full wave rectifier, in order that conducted noise fed back from the rectifier to the AC voltage source be maintained at required low levels. Examples of such an arrangement are shown in FIGS. 12, 13 and 14. An exemplary multi-stage EMI filter of this type of design is illustrated in FIG. 12. This EMI filter comprises a two-stage differential-mode noise filter formed by inductors $L_5$ and $L_6$ together with capacitors $C_0$ and $C_1$, and the series combination of capacitors $C_{12}$, $C_{13}$ and $C_{10}$, $C_{11}$; and a two-stage common-mode noise filter formed by inductors $L_3$, $L_4$ and capacitors $C_{10}$, $C_{11}$, $C_{12}$, and $C_{13}$.

As in earlier embodiments, voltage-sensing capacitor $C_{sense}$ senses the rectified AC line voltage and current-sensing resistor $R_{sense}$ senses an input current of the switching power converter. These signals are combined to generate a control signal that regulates the duty cycle of the boost power train.

Careful sensing of rectified AC line voltage is required to represent the currents in the various differentially connected EMI filtering capacitors. However, the output voltage of the diode bridge $D_a$, $D_b$, $D_c$, $D_d$ used in the earlier embodiments of FIGS. 10 and 11 is an imprecise measure of the rectified AC line voltage on the AC side of the diode bridge, because capacitor $C_2$ can back-bias one or more of these diodes thereby distorting the rectified line voltage. In accordance with one aspect of the invention, separate diodes $D_{10}$, $D_{11}$ are connected to sense and rectify the AC line voltage as an alternative to using the output of the 4-diode bridge as a measure of the rectified AC line voltage.

Generally, the separate diodes $D_{10}$, $D_{11}$ may be connected in either of the arrangements depicted in FIGS. 13 and 14. If positioned in the manner of FIG. 13, the output of diodes $D_{10}$, $D_{11}$ is not influenced by capacitor $C_2$. Their combined output thus provides a more accurate sense of rectified AC line voltage.

Applying the connection of FIG. 13 to the particular EMI filter of FIG. 12, the differential currents in capacitors $C_0$, $C_1$, $C_{10}$, $C_{11}$, $C_{12}$ and $C_{13}$ can be accurately represented. Moreover, the current in capacitor C2 can be approximated.

Positioing diodes $D_{10}$, $D_{11}$ as shown in FIG. 14, at the input of the EMI line filter enables diodes $D_{10}$, $D_{11}$ in conjunction with capacitor $C_{sense}$ to be used to estimate or represent all current flowing in differential capacitors of the EMI line filter, without introducing control instabilities.

Figure 15:
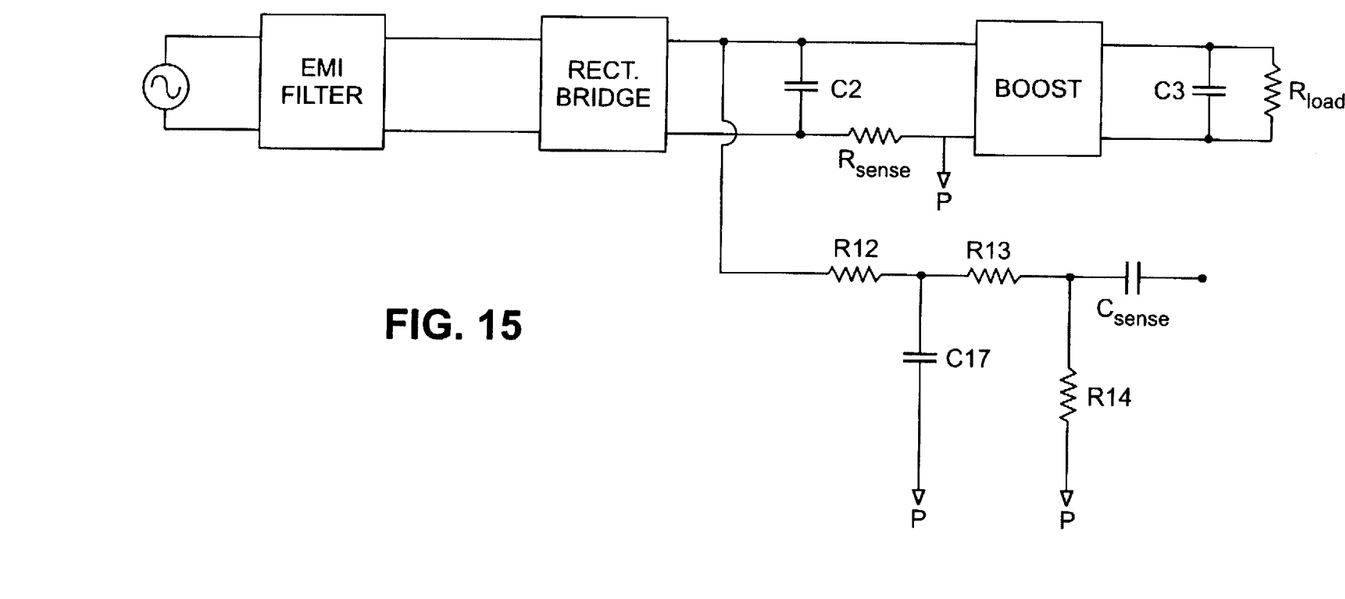
FIG. 15 is a circuit block diagram showing a capacitive sense tap located to the right of the rectifier bridge as in FIGS. 10 and 11, which uses the voltage divider network of FIGS. 13 and 14 but not the independent diode pair.

The rectified AC line voltage also can be sensed by the arrangement shown in FIG. 15, at the output of the 4-diode rectifier bridge similar to the arrangements of FIGS. 10 and 11. Here, a separate two-diode pair such as diodes $D_{10}$, $D_{11}$ is not used; and instead, the output voltage of the diode bridge $D_a$, $D_b$, $D_c$, $D_d$ is again used as a measure of the rectified AC line voltage. However, for EMI line filters consisting of two or more differentially connected capacitor legs located both to the right and to the left of the 4-diode rectifier bridge (such as are shown in FIG. 12), the most accurate sensing of total capacitor current would use sense points on both sides of the rectifier bridge; and then perform a summing or combining of the sensed signals for inputting to the current sense amplifier.

Pursuant to another aspect of the invention, damage to the current sense amplifier and connected components which might occur if capacitor $C_{sense}$ shorts out or breaks down, is avoided by connecting capacitor $C_{sense}$ to a voltage divider consisting of resistors $R_{12}$, $R_{13}$ and $R_{14}$. These components are connected as shown in FIGS. 13, 14 and 15. They assure a relatively low voltage across $C_{sense}$ and therefore risk of damage to the downstream components from a shorting failure of capacitor $C_{sense}$ is reduced. Moreover, including a resistive voltage divider increases the circuit designer's freedom in selecting a practical value for capacitor $C_{sense}$. For example, in the embodiment of FIG. 12, the capacitance of $C_{sense}$ is increased from a magnitude of some tens of picofarads to a few nanofarads, thus making the choice of a suitable sensing capacitor easier. Further, a capacitor having a low voltage rating (not more than 50 volts) can be used, whereas in the earlier embodiments the voltage rating of capacitor $C_{sense}$ is set by the highest potential line surge voltage, which is approximately one kilovolt. Nonetheless, the maximum voltage rating of the voltage divider resistors, particularly resistor $R_{12}$, must be considered.

Pursuant to another aspect of the invention, as shown in FIGS. 13, 14 and 15, a low-pass filter formed by resistor $R_{12}$ and capacitor $C_{17}$ decouples the control signal output of capacitor $C_{sense}$ from noise that may be traveling through the AC line or that may be generated by ringing in the EMI filter; and provides a further design option for alleviating control system instability.

The output of resistor $R_{sense}$ is improved as illustrated by FIG. 12, by adding a capacitive noise filter $C_{14}$, $C_{15}$ between resistors $R_{in-1}$, $R_{in-2}$ and resistors $R_{10}$, $R_{11}$. This noise filter by-passes noise in the current sense circuit to primary side ground denoted by the symbol "P", which may be a local ground on the circuit board.

In FIG. 12, resistors $R_{10}$, $R_{11}$, R15, $R_{16}$ and capacitors $C_{16}$, $C_{18}$ together with the current sense amplifier form a differential-mode amplifier which enhances the immunity from common-mode noise of the sensing signal obtained at resistor $R_{sense}$. As is common in designing a differential amplifier, in order to preserve the common-mode rejection ratio, component values are chosen so that $R_{in-1}=R_{in-2}$, $R_{10}=R_{11}$, $R_{15}=R_{16}$, and $C_{16}=C_{18}$. The ratio $R_{16}/(R_{11}+R_{in-2})$ determines the low-frequency voltage gain of the current sense amplifier. With $R_{in-1}=R_{in-2}$, the low-frequency gain of the current sense amplifier in volts per ampere is:

$$\frac{R_{16} \times R_{sense}}{R_{11}+R_{in-2}}$$

The combination of capacitor $C_{16}$ and resistor $R_{16}$ provides a high-frequency pole which determines the bandwidth of the current sense amplifier. The high frequency pole should be chosen such that it provides just enough bandwidth to pass the current-sensing signal without distortion, while at the same time reducing high frequency noise.

In constructing the circuit of FIG. 12, the following values for certain of components are advantageous: $C_0$, $C_1$=1 uF; $C_2$=3.3 uF; $C_3$=2.35 mF; C10, $C_{11}$=4700 pF; $C_{12}$, $C_{13}$=2200 pF; $C_{14}$, $C_{15}$=0.1 uF; $C_{16}$, $C_{18}$=150 pF; $C_{17}$=470 pF; $C_{sense}$=1.68 nF; $L_2$=130 uH; $L_3$, $L_4$=3 mH; $L_5$, $L_6$=40 uH; $R_{in-1}$, $R_{in-2}$=10 Ohms; $R_{10}$, $R_{11}$=1 kOhm; $R_{12}$, $R_{13}$=499 kOhms; $R_{14}$=10 kOhms; $R_{15}$, $R_{16}$=8.25 kOhms; $R_{sense}$=5 milliohms.

The invention claimed is:

1. A switched-mode rectifier powered from an AC line source having current and voltage components, said switched-mode rectifier comprising:

an AC rectifier bridge having an input and an output;
   an EMI line filter having its input connected to said AC line source and having a connection to said input of said AC rectifier bridge, said EMI line filter comprising a plurality of differentially connected capacitor legs wherein one of said legs is connected across said output of said AC rectifier bridge;

a switching power converter connected to said output of said AC rectifier bridge and comprising:
an inductor;
an output capacitor for creating a filtered output voltage for a load; and
a power switch having a variable on-off duty cycle for controlling current in said inductor; and a power factor correction circuit comprising:
means connected to said load for regulating the level of said filtered output voltage;
a voltage-sensing capacitor connected to the output of said AC rectifier bridge;
current-sensing means connected to sense an input current of said switching power converter;
a current sense amplifier connected to receive the combined signals from said voltage-sensing capacitor and said current-sensing means, said current sense amplifier having an output comprising a component representative of current through said one or more differentially connected capacitor legs of said EMI line filter; and
a pulse width modulator connected to said output of said current sense amplifier and to said filtered output voltage of said switching power converter, for continuously adjusting said duty cycle of said power switch to maintain said current and voltage components of said AC line source substantially in-phase and to substantially replicate the waveform of said voltage component.

2. Apparatus in accordance with claim 1, wherein said current-sensing means comprises a resistor.

3. Apparatus in accordance with claim 2, further comprising a voltage divider network connecting said voltage sensing capacitor to said current sense amplifier for reducing voltage across said voltage-sensing capacitor.

4. A switched-mode rectifier powered from an AC line source having current and voltage components, said switched-mode rectifier comprising:

an AC rectifier bridge having an input and an output;
an EMI line filter having its input connected to said AC line source and having a connection to said input of said AC rectifier bridge, said EMI line filter comprising a plurality of differentially connected capacitor legs wherein one of said legs is connected across said output of said AC rectifier bridge;
a switching power converter connected to said output of said AC rectifier bridge and comprising:
an inductor;
an output capacitor for creating a filtered output voltage for a load; and
a power switch having a variable on-off duty cycle for controlling current in said inductor; and
a power factor correction circuit comprising:
means connected to said load for regulating the level of said filtered output voltage;
diode means connected to said input of said AC rectifier bridge, for generating independently of said AC rectifier bridge an output comprising a rectified replica of said AC line voltage component;
a voltage-sensing capacitor;
means connecting said diode means output to said voltage-sensing capacitor;
current-sensing means connected to sense an input current of said switching power converter;
a current sense amplifier connected to receive the combined signals across said voltage-sensing capacitor and said current-sensing means, said current sense amplifier having an output comprising a component representative of current through said one or more differentially connected capacitor legs of said EMI line filter; and
a pulse width modulator connected to said output of said current sense amplifier and to said filtered output voltage of said switching power converter, for continuously adjusting said duty cycle of said power switch to maintain said current and voltage components of said AC line source substantially in-phase and to substantially replicate the waveform of said voltage component.

5. Apparatus in accordance with claim 4, wherein said current-sensing means comprises a resistor.

6. Apparatus in accordance with claim 5, further comprising a voltage divider network connecting said voltage sensing capacitor to said current sense amplifier for reducing voltage across said voltage-sensing capacitor.

7. A switched-mode rectifier powered from an AC line source having current and voltage components, said switched-mode rectifier comprising:

an AC rectifier bridge having an input and an output;
an EMI line filter having its input connected to said AC line source and having a connection to said input of said AC rectifier bridge, said EMI line filter comprising a plurality of differentially connected capacitor legs wherein one of said legs is connected across said output of said AC rectifier bridge;
a switching power converter connected to said output of said AC rectifier bridge and comprising:
an inductor;
an output capacitor for creating a filtered output voltage for a load; and
a power switch having a variable on-off duty cycle for controlling current in said inductor; and
a power factor correction circuit comprising:
means connected to said load for regulating the level of said filtered output voltage;
diode means connected across said AC line source, for generating independently of said AC rectifier bridge an output comprising a rectified replica of said AC line voltage component;
a voltage-sensing capacitor;
means connecting said diode means output to said voltage-sensing capacitor,
current-sensing means connected to sense an input current of said switching power converter;
a current sense amplifier connected to receive the combined signals across said voltage-sensing capacitor and said current-sensing means, said current sense amplifier having an output comprising a component representative of current through said one or more differentially connected capacitor legs of said EMI line filter; and
a pulse width modulator connected to said output of said current sense amplifier and to said filtered output voltage of said switching power converter, for continuously adjusting said duty cycle of said power switch to maintain said current and voltage components of said AC line source substantially in-phase and to substantially replicate the waveform of said voltage component.

8. Apparatus in accordance with claim 7, wherein said current-sensing means comprises a resistor.

9. Apparatus in accordance with claim 8, further comprising a voltage divider network connecting said voltage sensing capacitor to said current sense amplifier for reducing voltage across said voltage-sensing capacitor.

10. Apparatus in accordance with claims 1, 2, 3, 4, 5, 6, 7, 8, or 9, further comprising a low-pass RC filter connected to decouple said voltage-sensing capacitor from said AC line source.

11. Apparatus in accordance with claims 1, 2, 3, 4, 5, 6, 7, 8, or 9, wherein said inductor is a boost inductor.

12. Apparatus in accordance with claim 11, further comprising a low-pass RC filter connected to decouple said voltage-sensing capacitor from said AC line source.

* * * * *